Dec. 29, 1931.   A. E. GLANCY   1,838,616
MEASURING DEVICE
Filed Feb. 6, 1928

Inventor
Anna E. Glancy.
By Harry H. Styll
Attorney

Patented Dec. 29, 1931

1,838,616

UNITED STATES PATENT OFFICE

ANNA E. GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

MEASURING DEVICE

Application filed February 6, 1928. Serial No. 252,247.

This invention relates to improvements in measuring devices and has particular reference to a measuring protractor for laying off lenses.

The principal object of the invention is to provide a concavo-convex measuring device on which curved transparent objects may be laid to be marked off, whereby the marking surface will be brought to the closest possible proximity to the scale surface of the measuring device.

Another object of the invention is to provide simple, efficient and economical means on which curved articles may be placed while they are being laid off to some desired measurement.

Another object of the invention is to provide means in such a device whereby the measuring device may be solidly supported when the convex side thereof is in contact with a table or other support.

Other objects and advantages of the invention will become apparent from the following description taken in connection with the accompanying drawings, and it will be apparent that many changes in the details of construction and arrangement of parts may be made without departing from the spirit of the invention as expressed in the accompanying claims. I, therefore, do not wish to be limited to the exact details and arrangements shown, as the preferred forms only have been shown by way of illustration.

Referring to the drawings.

Figure 1:
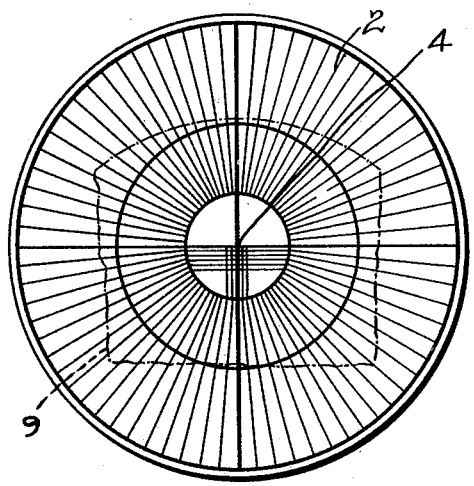
Fig. 1 is a top or plan view of the device showing an outline of the lens being marked in dot and dash lines.
Figure 2:
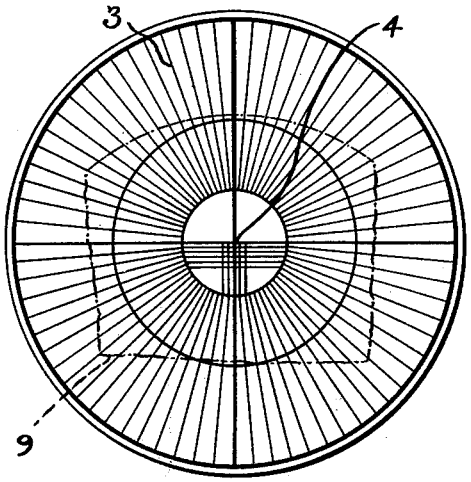
Fig. 2 is a bottom view of the device showing the lens indicated in a way similar to that of Fig. 1.

In the laying off of lenses, particularly ophthalmic lenses, to determine their line of axis, the position of the screw holes, the contour or edge shape of the lens, the relationship of the bifocal segment with regard to the distance portion, etc., it has been customary to lay the lenses on a flat protractor. In view of the fact that practically all of the modern ophthalmic lenses are of a dish or curve shape it is difficult to lay off the desired markings on the lens accurately due to the fact that the surface of the lens does not match the surface of the protractor or measuring scale. This is particularly noticeable when the convex side of the lens is brought into contact with the surface of the protractor. It is also difficult when this side is being marked to prevent it from rocking, getting out of position and making the marking entirely erroneous.

It is, therefore, with a view to obviating these difficulties and producing a simple, efficient and economical device that I have developed my invention.

Referring to the drawings wherein similar reference characters denote corresponding parts throughout, I provide a concavo-convex body portion 1, on the outer surface of which I lay off the desired scale or marking insignia 2 and on the inside of which the desired insignia 3. The insignia 2 is laid off on the convex side of the body portion 1 and the insignia 3 on the concave side of the body portion 1. The insignia is centered at the point 4 of the body portion 1. The body portion 1 is preferably round, although other shapes may be used. It may be made of any suitable material, such as porcelain, compressed paper having a porcelain finish, celluloid, glass, or any other desired material. The markings 2 and 3 may be placed thereon in any desired way and to any desirable configuration or system. With this protractor prescription work can be accomplished with great facility as the laying off of a lens for fitting is made accurate and simple. A cylindrical lens for example can be laid off to set the axis at a required angle very accurately, without regard to the skill of the individual dispenser. A blank is placed upon the body portion 1, and the protractor markings are clearly visible through the blank. Each line can radiate at an angle of 5 degrees from the common center or at any other convenient angle. If an angle of 45 degrees is required for the axis of the cylindrical lens, it is a simple matter to trace this line across the face of the blank with some marking fluid.

Bifocal blanks can have the arcuate line of the segment traced with the usual marking fluid, and be placed on the body portion 1. If the optical center of the segment is to be at an angle with the optical center of the major portion as is usually the case for the convergence of vision at near points, then the blank can be twisted around on the body portion 1 until the center of the segment coincides with the required angle marked on the body portion 1. Should the center of the major portion be required to be lowered or raised say 2 or 3 millimeters, this amount can be measured from the parallel lines crossing through the center of the body portion 1.

Each lens of a pair can be laid out by this means for the correction of astigmatism, and each lens can vary or be similar to its mate. The blanks may be moved in any direction until the lines on the protractor occupy the position it is desired to trace on the blanks. The curve of the body portion forces the blanks to fit snugly thereon, and be moved in small degree or large with equal facility. The transparency of the lens blanks has been utilized in this invention, and the markings on the body portion below can be clearly seen through the blanks, so that any lines on the body portion can be traced on to the blank. In this way a prescription can be quickly filled and will be quite accurate.

It is apparent that when the concave side of the body portion 1 is down the body will rest securely on a table top or other support. It may be supported if desired in a support 5, as indicated in Fig. 3, the support 5 in this case being an annular ring having a seat 6 adapted to engage the peripheral edge of the concave side of the disc.

Figure 3:
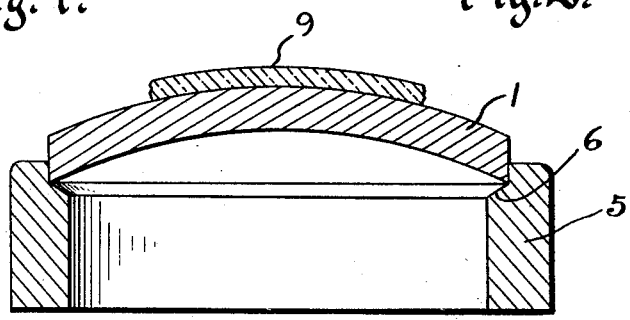
Fig. 3 is a cross section through the device and through a stand for supporting the same.

Fig. 3 shows a lens 9 in place on the convex surface of the body portion 1. The under side of the lens 9 fits the outer curve of the body portion 1 so that the lens surface is immediately associated with the surface of the measuring device on which the marking insignia is indicated.

Figure 4:
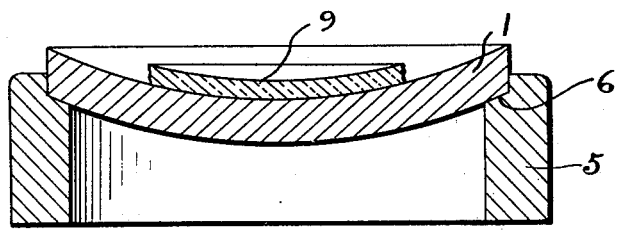
Fig. 4 is a cross section similar to Fig. 3 except that the concave surface of the device is shown uppermost.

In Fig. 4 the lens 9 is shown in engagement with the concave side of the body portion 1. Again the surface of the lens is in intimate association with the surface of the body portion having the marking insignia.

It will, therefore, be seen that I have provided a simple device that will permit curved objects, particularly curved lens surfaces, to be laid off or marked on either the convex or concave surfaces so that these surfaces will be intimately associated with the corresponding surface of the measuring device.

From the foregoing description it will be seen that I have provided simple, efficient and economical means well adapted to secure all the advantages of the invention.

Having described my invention, I claim:

1. A device of the character described comprising an opaque concavo-convex disk having measuring indicia on the concave and convex surfaces and an annular peripheral support adapted to suppport the disc on a plane surface whereby either surface may be used by reversing the disc to bring the desired side upwards, said measuring indicia being adapted for use independently of each other.

2. A measuring device comprising a concavo-convex measuring plate having measuring means on its surfaces and a supporting member associated therewith adapted to hold said plate so it will not rock on its convex surface, said support comprising means for supporting the edges of the plate and a resting surface substantially normal to the axis of the plate.

3. A measuring device comprising a sphero segmental measuring disc with measuring means on its surfaces and a supporting member associated therewith adapted to hold the said disc so it will not rock on its convex surface, said support comprising an annulus engaging and supporting the edges of the disc and a rest support portion the plane of which is substantially normal to the axis of the disc.

ANNA E. GLANCY.